Feb. 2, 1926.
L. F. SCHUMACHER
VEHICLE WHEEL
Filed Feb. 26, 1925
1,571,493
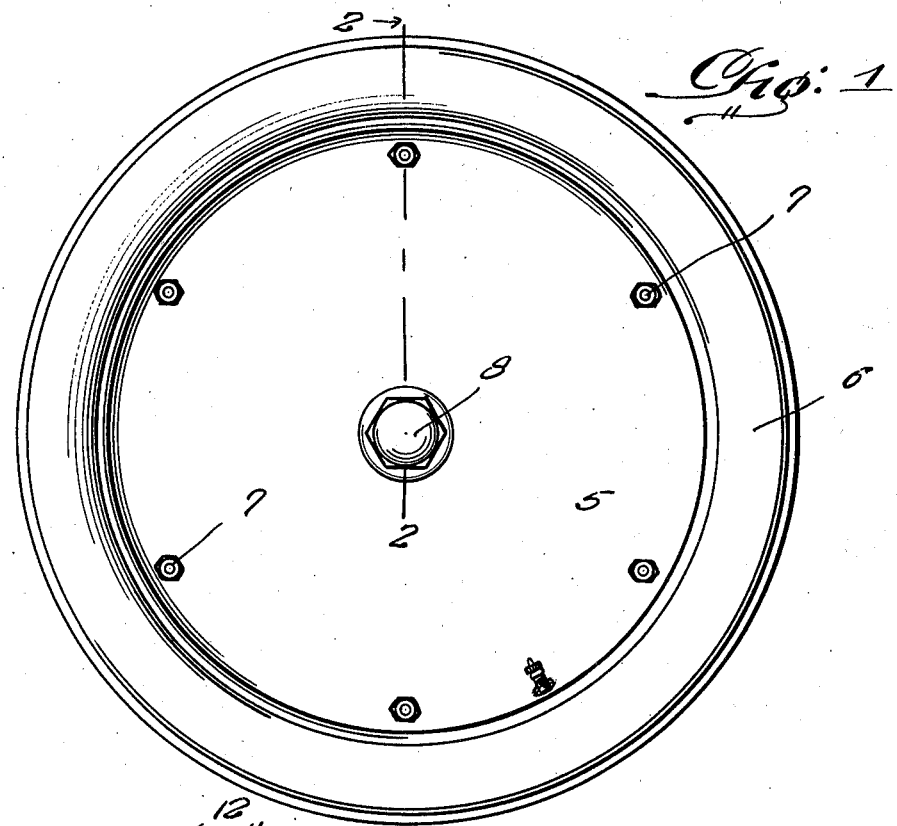
Fig: 1
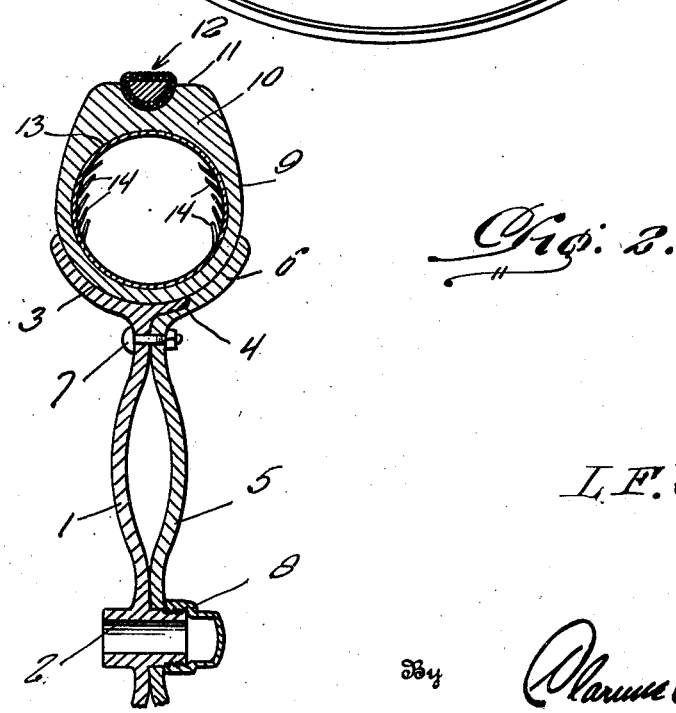
Fig: 2.
L. F. Schumacher,
Inventor
By Clarence O'Brien
Attorney Patented Feb. 2, 1926.

1,571,493

UNITED STATES PATENT OFFICE.

LUDWIG F. SCHUMACHER, OF NEW YORK, N. Y.

VEHICLE WHEEL.

Application filed February 26, 1925. Serial No. 11,805.

*To all whom it may concern:*

Be it known that I, LUDWIG F. SCHUMACHER, a citizen of the United States, residing at New York city, in the county of New York and State of New York, have invented certain new and useful Improvements in a Vehicle Wheel, of which the following is a specification.

This invention relates to an improved vehicle wheel construction, and it has particular reference to a device of the class which is especially adapted for use upon automobiles.

More specifically speaking, the invention relates to what is commonly referred to as a disk wheel, which in the present instance is of special construction, and an improved pneumatic tire which is removably mounted thereon.

It is my aim to generally improve upon inventions of this class by providing one of comparative simplicity and durability which is such in construction as to facilitate handling, application and removal of the tire, and one including an especially constructed tire of a construction to insure a comparatively long life.

The advantages and features derived from the particular construction and arrangement of parts employed will be set out as the description goes on.

In the accompanying drawing forming a part of this application and in which like numerals are employed to designate like parts throughout the same:

Figure 1 is a side elevation of a vehicle wheel constructed in accordance with the present invention.

Fig. 2 is an enlarged detail vertical section taken substantially on the plane of the line 2—2, of Fig. 1.

In carrying out the invention I employ a wheel which is made up of a main inner disk 1 provided at its center with a mounting hub 2 extending on opposite sides thereof as clearly illustrated in Fig. 2. The disk may be, and preferably is, bowed as shown. At its peripheral portion it is provided with an inwardly extending arcuate flange 3 forming one half of a tire rim. Attention is also directed at this time to the comparatively short flange which projects in an opposite direction on the opposite side of the disk. It will be observed that this smaller flange 4 lies in an arcuate plane with the first named flange 3.

Cooperable with the disk 1 is a complementary disk 5 bowed in an opposite direction and formed at its center with an opening through which the screw threaded end of the hub 2 projects. It will be noted that the curvature of the disks is such as to bring them into contact with each other at the hub and adjacent the tire rim. The disk 4 is, like the disk 1, provided with a laterally extending arcuate flange 6 cooperating with the flange 3 in completing the tire rim. It will be noted that the flange 6, is formed adjacent its point of connection with the body portion 5, with a circumferential groove or recess to accommodate the aforesaid short flange 4.

With the flange seated in the recess, its outer side is disposed flush with the corresponding side of the flange 6, thus making for continuity in surface from the extremity of the flanges 3 and 6 inwardly. Passing through alined openings in the contacting outer portions of the disks are removable retaining bolts 7. For maintaining the inner portions of the disks in assembled relation, a removable hub cap 8 is fitted on the extended screw threaded end of the hub as shown.

Adapted for use in connection with the improved tire rim is a pneumatic tire of novel construction. As shown the improved tire comprises a completely closed casing having a thickened outer peripheral portion 10 formed with a flattened tread surface 11 which in turn is provided with a substantially semi-circular groove. This groove constitutes a seat for a traction forming cable 12. It will be noted that the cable is substantially semi-circular in cross section, the diameter being such as to dispose the flat traction forming surface spaced outwardly beyond the tread surface 11 of the casing.

In practice the cable will embody a central core about which strands will be wound diagonally, either left or right to form novel anti-slipping means. Confined within the casing is an elastic inflation tube 13. This tube is formed on its interior at predetermined intervals with circumferentially extending highly flexible fins 14 arranged so that they may overlap as desired. As stated, in case of puncture, when the article is withdrawn, the air pressure will serve to force the fins outwardly to cover the otherwise open hole.

From the foregoing description and drawing, it will be evident that I have evolved, and produced an exceedingly novel, yet inexpensive wheel and tire structure. One particular advantage is that the permanently mounted inner disk need not be removed from the axle in applying or removing the tire, thus facilitating handling of the latter. Also by this method it is unnecessary to remove the outer disk, which is comparatively light in weight and can be readily handled by a single person. Repairs may then be made without removing the tire or necessarily jacking the wheel off the ground.

The construction of the tire rim is such as to eliminate possible pinching of the tire due to the smooth and inner seating surface provided. The cross sectional shape of the tire is such as to afford effective holding means for the tire, and the provision of the flange 4 serves to prevent the tire from falling off of the stationary rim section when removing the movable disk. The difficulty of removing common open tires out of comparatively complicated rims is entirely avoided. In connection with the tire, it should be observed that better traction is afforded, increased life is assured, and easy riding qualities are present. Here it might be pointed out that while a separate tube 13 may be desirable in some instances, the tube is preferably in the form of a highly elastic lining permanently secured to the wall of the chamber.

It is also to be stated that the ends of the traction cable will be spliced together through the medium of the comparatively long splice or electrically welded together at the ends, thereby securing even thickness.

It might be added that while the disks have a particular given shape, they may well be straight, disked in or out, or of any desired shape. Further, in order to insure better traction, the cable strands on a "right" wheel will run toward the left and vice versa on a "left" wheel. Inasmuch as the cable is not fastened permanently and is held in place by the air pressure, it can be interchanged.

These and other advantageous features of the invention have doubtlessly been made apparent from the foregoing description taken in connection with the accompanying drawings. Therefore a more lengthy description is thought unnecessary.

Although I have shown and described the preferred embodiment of the invention, it is to be understood that minor changes coming within the field of invention claimed may be resorted to if desired.

Having thus described my invention, what I claim as new is:—

In a vehicle wheel structure of the class described, an inner relatively stationary disc provided at its center with a hub and at its outer peripheral edge with an arcuated flange extending laterally beyond both faces thereof, and a removable disc formed at its center with an opening through which is a portion of said hub projects, and provided upon its outer peripheral edge with an arcuated flange directed laterally from one face only, said last mentioned flange being formed at its point of connection with the removable disc with a groove for reception of the adjacent portion of the first named flange.

In testimony whereof I affix my signature.

LUDWIG F. SCHUMACHER.